United States Patent
Ogawa et al.

(10) Patent No.: US 8,225,941 B2
(45) Date of Patent: Jul. 24, 2012

(54) HOLLOW FIBER MEMBRANE FOR TREATING LIQUIDS

(75) Inventors: Hirofumi Ogawa, Ohtsu (JP); Noriaki Kato, Ohtsu (JP); Hideyuki Yokota, Ohtsu (JP); Junsuke Morita, Ohtsu (JP)

(73) Assignee: Toyo Boseki Kabushiki Kaisha, Osaka-shi, Osaka (JP)

( * ) Notice: Subject to any disclaimer, the term of this patent is extended or adjusted under 35 U.S.C. 154(b) by 191 days.

(21) Appl. No.: 12/682,814

(22) PCT Filed: Oct. 16, 2008

(86) PCT No.: PCT/JP2008/068729
§ 371 (c)(1),
(2), (4) Date: Apr. 13, 2010

(87) PCT Pub. No.: WO2009/051168
PCT Pub. Date: Apr. 23, 2009

(65) Prior Publication Data
US 2010/0219122 A1 Sep. 2, 2010

(30) Foreign Application Priority Data
Oct. 19, 2007 (JP) ................................. 2007-272101

(51) Int. Cl.
*B01D 33/21* (2006.01)
*B01D 39/00* (2006.01)
*B01D 39/14* (2006.01)
*B01D 70/28* (2006.01)

(52) U.S. Cl. .......... 210/500.23; 210/500.41; 210/500.42

(58) Field of Classification Search ............. 210/500.23, 210/500.42, 650, 500.27, 490, 500.36, 500.41; 264/177.14
See application file for complete search history.

(56) References Cited

U.S. PATENT DOCUMENTS 4,481,260 A 11/1984 Nohmi
4,882,223 A * 11/1989 Aptel et al. .................. 428/398
(Continued)

FOREIGN PATENT DOCUMENTS

JP 56-105704 A 8/1981
(Continued)

OTHER PUBLICATIONS

International Search Report of PCT/JP2008/068729, mailing date of Dec. 9, 2008.

*Primary Examiner* — Ana Fortuna
(74) *Attorney, Agent, or Firm* — Westerman, Hattori, Daniels & Adrian, LLP

(57) ABSTRACT

The present invention provides a hollow fiber membrane for treating liquids. When used for a hollow fiber membrane module for refining a fermented liquid such as beer or wine, the hollow fiber membrane exhibits a high filtration performance per unit area thereof, with reduced clogging of the membrane. The membrane performance is sufficiently recovered by washing.

The present invention is a hollow fiber membrane for treating liquids, wherein a ratio of Flux 120 to Flux 30 is 0.45 or higher when filtration is performed by supplying a solution having a turbidity of 20 NTU into a hollow fiber membrane having an internal diameter of 500 to 1500 μm and a membrane thickness of 100 to 500 μm with a transmembrane pressure of 1.5 bar, the Flux 30 being flux 30 minutes after the start of the filtration, the Flux 120 being flux 120 minutes after the start of the filtration.

5 Claims, 4 Drawing Sheets

U.S. PATENT DOCUMENTS

| | | | |
|---|---|---|---|
| 5,232,597 A * | 8/1993 | Eguchi | 210/500.23 |
| 5,340,480 A * | 8/1994 | Kawata et al. | 210/500.23 |
| 5,919,370 A | 7/1999 | Rottger et al. | |
| 6,632,366 B1 * | 10/2003 | Nakatsuka et al. | 210/655 |
| 7,364,653 B1 | 4/2008 | Slegers | |
| 7,638,059 B2 * | 12/2009 | Kim et al. | 210/651 |
| 7,837,042 B2 * | 11/2010 | Yokota et al. | 210/500.23 |
| 2003/0141251 A1 | 7/2003 | Ji et al. | |
| 2005/0205488 A1 * | 9/2005 | Shinada et al. | 210/490 |

FOREIGN PATENT DOCUMENTS

| | | |
|---|---|---|
| JP | 56-115602 A | 9/1981 |
| JP | 58-132111 A | 8/1983 |
| JP | 60-246812 A | 12/1985 |
| JP | 61-000408 A | 1/1986 |
| JP | 5-168873 A | 7/1993 |
| JP | 5-301034 A | 11/1993 |
| JP | 9-047645 A | 2/1997 |
| JP | 11-506387 A | 6/1999 |
| JP | 2002-525196 A | 8/2002 |
| JP | 2005-515881 A | 6/2005 |
| JP | 2006-136278 A | 6/2006 |

* cited by examiner

HOLLOW FIBER MEMBRANE FOR TREATING LIQUIDS

This application in a 371 of PCT/ JP2008/068729, filed on Oct. 16, 2008, which claims priority of JAPAN 2007-272101 Oct. 19, 2007.

TECHNICAL FIELD

The present invention relates to a polymeric porous hollow fiber membrane for use in the treatment of liquids in the food field, the medical field, the semiconductor field, the energy field and the water treatment field. More specifically, the present invention relates to a hollow fiber membrane for treating liquids that exhibits high filtration performance with respect to wine yeast liquids, reduces clogging of the membrane, and improves recoverability of membrane performance by washing.

BACKGROUND ART

Diatomaceous earth has been used in the food field, particularly in the process of treating fermented liquids, such as the removal of yeast fluids, solid matter, colloids or the like from beer or wine after fermentation. However, the use of diatomaceous earth incurs several problems including the unconfirmed safety of diatomaceous earth, the disposal of used diatomaceous earth, which cannot be incinerated, and the high disposal cost for the large amount of diatomaceous earth required. Accordingly, in recent years, hollow fiber membrane-type devices of advantageously small body size, such as ultrafiltration membranes or microfiltration membranes, have been attracting attention as devices to be used for the fermented liquid treatment.

In the treatment of fermented liquids such as wine, beer or the like using a hollow fiber membrane module, the fermented liquid is generally refined by way of cross-flow filtration, in which the fermented liquid is filtrated from inside to outside of the hollow fiber membrane by supplying the fermented liquid to a hollow portion of a hollow fiber membrane at a high flow amount under a high pressure of about 1 to 1.5 bar. The hollow fiber membrane used in this filtration must have a high filtration performance per unit area thereof, reduced clogging of the membrane during the filtration, i.e., reduced time-dependent degradation of the membrane. The membrane performance is also required to be sufficiently recovered by washing.

Patent Literature 1 discloses a fermented liquid treatment method using a hollow fiber membrane in which the processing efficiency is increased by the usage of an improved filtration system and an improved filtration method. However, this method is directed to the system and method of filtration, and is completely silent about the performance or characteristic of the hollow fiber membrane, which has the biggest influence on the performance of the fermented liquid filtration.

Further, Patent Literature 2 discloses a technique for preventing flavor changes during fermented alcohol filtration such as wine filtration. In this technique, the membrane filtration module is washed with an alcohol aqueous solution before an alcoholic beverage is supplied to the module, thereby preventing flavor changes caused by a sealing material, a potting material, or a membrane material. However, this method is directed to preprocessing of a membrane before the filtration of fermented liquids, and is silent about the performance or characteristics of the hollow fiber membrane.

Patent Literature 3 discloses a method of preventing membrane clogging during filtration of food such as beer, wine, liquor, soy sauce, fruit juice and the like, by using a porous complex structure. This porous complex structure is obtained by providing a water-soluble polymer having been processed to be water-insoluble in the porous voids of a polytetrafluoroethylene porous body (PTFE, hereinafter). However, this method requires crosslinking treatment to make the polymer water-insoluble after the water-soluble polymer is permeated into the porous voids of a PTFE, thereby causing some complications in the process. Moreover, using the expensive PTFE increases the production cost.

Furthermore, Patent Literature 4 discloses another filtration membrane for the filtration of beverages such as fruit juice or wine. This membrane is produced by adding a $C_{2-12}$ acid anhydride to a spinning solution to provide a sharp pore size distribution and durability to the membrane, thereby improving the productivity. However, because of the acid anhydride contained in the spinning solution, this method incurs problematic degradation of the membrane material due to oxidization while the membranes are stored.

In general methods, the pore diameter is increased so as to improve permeability of a hollow fiber membrane; however, this tends to decrease the fractionation performance and the strength at the same time. A hollow fiber membrane is roughly classified by its membrane structure, to symmetrical membranes in which the pore diameters are substantially constant in the direction along the membrane thickness of the hollow fiber membrane; and asymmetrical membranes in which the pore diameters continuously or discontinuously change, and thus differ at the inner surfaces, inside portions and outer surfaces of the membranes. Among them, the symmetrical membranes exhibit a large resistance to the flow of the fluid at their entire thickness portions when used for filtration; therefore, it is difficult to achieve a large flow amount. This also tends to cause clogging of the membrane due to the solutes (substances to be removed). The removal of the unwanted substance by the filtration from the liquid is ensured by the surface layer effect related to the pore diameter of the membrane surface, and the membrane depth effect related to the thickness portion of the membrane. Separation mainly relying on the membrane depth effect is expected to achieve sharp fractionation performance; however, it is difficult to achieve a larger flow amount thereby because this separation requires a membrane to have a certain thickness. Further, this type of membrane also has a defect in that the flow amount tends to decrease with time because of the clogging of the membrane due to a substance to be removed. The contribution of the membrane depth effect is relatively large in the above-described symmetrical membrane, and thus, this defect is considered to be easily revealed in the symmetrical membrane. Further, it is a general practice to increase the density of one of the membrane surfaces in which the fluid comes through so as to enable the performance of a hollow fiber membrane to be recovered by washing; however, this also results in a disadvantageous decrease in the filtration flow amount.

Patent Literature 5 discloses a semipermeable membrane with a multilayer structure, which comprises a separation layer A comprising a ε-caprolactam soluble polymer and having a molecular cut-off of from 500 to 5,000,000 Daltons, a support layer B having a hydrodynamic resistance negligibly small as compared with those of the layers A and C, and the layer C having pores with diameters larger than those of the pores of the separation layer A and smaller than those of the pores of the support layer B. Described as the subject matter to be achieved by this technique is to provide a membrane that enables accurate control of the molecular cut-off and hydrodynamic permeability in which the hydrodynamic permeability is accurately controlled without relation to the molecular cut-off. This enables production of a membrane having a designated molecular cut-off and having a low, medium or high permeability as required. However, the strength, membrane performance sustainability and membrane performance recoverability of this membrane are not considered in this prior art.

Patent Literature 6 discloses a membrane characterized such that the membrane has micropores with a pore diameter of 500 nm or less at a layer in the proximity of the membrane inner wall surface and a micropore distribution at its cross section in the membrane thickness direction, and whose distribution has at least one pore with a maximum diameter of a specified value. This technique is substantially directed to a medical membrane excellent in biocompatibility, intended to inhibit a high molecular weight protein from infiltrating the membrane and to decrease a contact area of the membrane to the high molecular weight protein to thereby improve the biocompatibility, by forming a dense inner surface which is to contact blood. Further, the dense structure in the proximity of the outer surface of the membrane, following the maximum pore diameter portion of the section of the membrane, is intended to inhibit infiltration of an endotoxin fragment from the outer surface of the membrane. Therefore, the dense-coarse-dense structure of the membrane is provided as a required structure for a blood-treating membrane for its substance-removing ability, biocompatibility and inhibition of infiltration of endotoxin. Patent Literature 6 is silent about any relationship with other properties such as membrane performance sustainability or membrane performance recoverability after washing.

[Citation List]
  [Patent Literature]
Patent Literature 1: Japanese Unexamined Patent Literature No. 2002-525196
Patent Literature 2: Japanese Unexamined Patent Literature No. 2006-136278
Patent Literature 3: Japanese Unexamined Patent Literature No. 1993-301034
Patent Literature 4: Japanese Unexamined Patent Literature No. 2005-515881
Patent Literature 5: Japanese Unexamined Patent Literature No. 1999-506387
Patent Literature 6: Japanese Unexamined Patent Literature No.

DISCLOSURE OF INVENTION

Technical Problem

Figure 1:
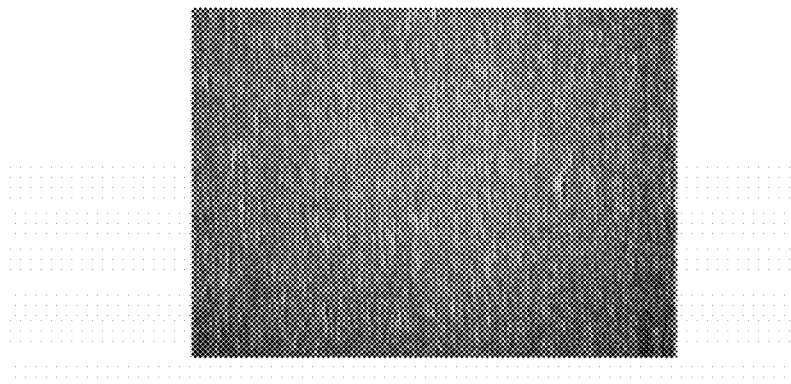
FIG. 1 is an electron microscope image (magnified 10,000×) of the inner surface of a membrane according to Example 1.

The present invention was made in view of the above prior art problems. More specifically, an object of the present invention is to provide a hollow fiber membrane having excellent filtration performance with respect to wine-fermented liquid. This membrane can reduce clogging during the filtration, and has excellent membrane performance recoverability by washing.

Solution to Problem

As a result of intensive research to solve the above problems, the present inventors found the following hollow fiber membranes for treating liquids.

1. A hollow fiber membrane for treating liquids, wherein a ratio of Flux 120 to Flux 30 (Flux120/Flux30) is 0.45 or higher when filtration is performed by supplying a solution having a turbidity of 20 NTU into a hollow fiber membrane having an internal diameter of 500 to 1500 μm and a membrane thickness of 100 to 500 μm with a transmembrane pressure of 1.5 bar, the Flux 30 being flux 30 minutes after the start of the filtration, the Flux 120 being flux 120 minutes after the start of the filtration.
2. A hollow fiber membrane for treating liquids wherein the Flux 30 is 30 L/m$^2$/h/bar or higher.
3. A hollow fiber membrane for treating liquids wherein pure water flux from inside of the hollow fiber membrane to outside of the hollow fiber membrane under 22° C. and 1 bar falls within a range of from 500 to 2,500 L/m$^2$/h/bar.
4. A hollow fiber membrane for treating liquids wherein the hollow fiber membrane has a structure such that:
  (a) dense layers are formed on the inner and outer surfaces;
  (b) a pore diameter in the vicinity of the inner surface is smaller than a pore diameter in the vicinity of the outer surface; and
  (c) a porosity of the hollow fiber membrane increases from the inner surface toward the outer surface, the porosity being maximum in at least one portion and thereafter decreasing toward the outer surface.

Advantageous Effects of Invention

With its adequate flexibility of the inner surface, a characteristic of the hollow fiber membrane of the present invention is that it significantly suppresses formation of a cake layer when used for filtration of a liquid containing suspended matter. Accordingly, the hollow fiber membrane of the present invention provides effects of excellent filtration stability and membrane performance recoverability when used for dialysis or filtration of a liquid containing a large amount of suspended matter, such as wine, beer and the like.

BEST MODE FOR CARRYING OUT THE INVENTION

The present invention is described in detail below.

Preferably, the internal diameter of the hollow fiber membrane of the present invention is from 500 to 1,500 μm. In some cases, fine particles whose maximum particle diameter is about 500 μm are present in a fermented liquid. When the internal diameter is too small, the hollow portion of the hollow fiber membrane may be clogged. Therefore, the internal diameter of the hollow fiber membrane is preferably 600 μm or more, more preferably 700 μm or more, still further preferably 800 μm or more. When the internal diameter is too large, maintaining the ratio of the hollow portion requires the enlargement of the membrane thickness to maintain the pressure resistance. However, when the membrane thickness is increased, a sufficient filtration flow amount may not be achieved during the filtration of a fermented liquid. Additionally, the amount of spinning solution may become too large when the spinning solution and the inner liquid are discharged at the same time from the spinneret to be coagulated in a coagulating bath, thus resulting in insufficient coagulation and an unstable form. Further, when the internal diameter is too large, the running cost may be increased because the amount of electrical energy to operate a pump for feeding a fermented liquid needs to be increased to obtain a linear velocity required for cross-flow filtration. Accordingly, the internal diameter of the hollow fiber membrane is preferably 1,400 μm or less, more preferably 1,300 μm or less.

The membrane thickness of the hollow fiber membrane is preferably from 100 to 500 μm, more preferably from 200 to 400 μm. When the membrane thickness is too thin, the membrane may be broken when a pressure of 1.0 to 1.5 bars is applied thereto during the filtration of a fermented liquid. When the membrane thickness is too thick, a sufficient filtration flow amount may not be achieved during the filtration of a fermented liquid.

According to the hollow fiber membrane of the present invention, a ratio of Flux 120 (flux 120 minutes after the start of the filtration of the same) to Flux 30 (flux 30 minutes after the start of the filtration of a solution having a turbidity of NTU), i.e., Flux 120/Flux 30, is 0.45 or higher, more preferably 0.50 or higher. When the above-described ratio is less than 0.45, the filtration of a solution may not be stably performed because the temporal stability during solution filtration is poor due to the clogging of the membrane and the formation of a cake layer, significantly reducing the performance and preventing the initial performance from being maintained. In order to perform filtration of a solution with further stability, a ratio of 0.55 or higher is further preferred.

The hollow fiber membrane of the present invention preferably has a structure in which dense layers are formed on the inner and outer surfaces; the pore diameter at the inner surface is smaller than the pore diameter at the outer surface; and the porosity initially increases from the inner surface toward the outer surface, becomes maximum in at least one portion, and thereafter decreases toward the outer surface. The membrane characteristics are likely to be maintained because the effect of a shear force by cross-flow filtration is exerted at the inner surface as a result of the formation of the dense layers on the inner and outer surfaces of the membrane. Further, because a dense layer is formed on the inner surface of the dense-coarse-dense structure, substances to be removed are easily removed during backwashing; thus, the hollow fiber membrane is excellent in the recoverability of the membrane performance. At least some substances to be removed are likely trapped in the outer dense layer; however, trapped substances are easily removed because the washing solution flows in the direction from small pore diameter to large pore diameter during backwashing. Further, although the detailed mechanism is unknown, the washing solution in the inside portion of the membrane wall flows, likely because of the dense-coarse-dense structure, nonlinearly and at random, and the washing effect is thereby enhanced.

In the present invention, flux 30 minutes after the start of the filtration (Flux 30) is preferably 30 L/m²/h/bar or higher, more preferably 35 L/m²/h/bar or higher, further preferably 40 L/m²/h/bar or higher. 30 minutes after the start of the filtration is when the formation of a cake layer on the membrane surface remarkably begins. A membrane having Flux 30 of 30 L/m²/h/bar or higher generally meets the demands of the market.

In the present invention, the recovery rate of the hollow fiber membrane by washing is preferably 70% or higher. When the recovery rate by washing is low, a sufficient amount cannot be treated during long-term use, and the number of hollow fiber membranes needs to be increased to increase the amount of treatment. Or, the hollow fiber membrane module needs to be frequently replaced, which is a disadvantage in terms of cost. Accordingly, the recovery rate by washing is preferably 80% or higher, more preferably 90% or higher.

According to the hollow fiber membrane of the present invention, the pure water flux from the inside of the hollow fiber membrane to the outside of the hollow fiber membrane at a temperature of 22° C. and an operation pressure of 1 bar is preferably from 500 to 2,500 L/m²/h/bar, more preferably from 800 to 2,000 L/m²/h/bar. When the pure water flux is too small, the filtration flow amount of a fermented liquid per unit membrane area may not be sufficient. When the pure water flux is too large, the strength of membrane may become weak, resulting in a reduction of the pressure resistance.

According to the hollow fiber membrane of the present invention, the maximum pore diameter obtained by the bubble point method is preferably from 0.05 to 0.5 μm, more preferably from 0.1 to 0.3 μm, further preferably from 0.15 to 0.25 μm. When the maximum pore diameter is too small, if the membrane is used to treat beverages such as wine, for example, even a flavor component and a fragrance component may be removed. On the other hand, when the maximum pore diameter is too large, solids, colloids, and other like substances that normally should be removed may pass (permeate) through the membrane.

As described above, one of the characteristics of the hollow fiber membrane of the present invention is that the hollow fiber membrane has a structure in which the dense layers are formed on the inner and outer surfaces; and the porosity initially increases from the inner surface toward the outer surface, becomes maximum in at least one portion, and thereafter decreases toward the outer surface. The pore diameter and porosity of the present invention can be determined by loading electron microscope images of a dry membrane onto a computer, analyzing the images using image analysis software, and quantifying the results. Specifically, the porosity is determined by formula (1), and the pore diameter (average pore diameter) is determined by formulae (2) and (3), from the total area of the images loaded into image analysis software, the sum of pore areas, and the number of pores.

$$\text{Porosity}(\%) = 100 \times (\text{sum of pore areas/total area of the images loaded}) \quad (1)$$

$$\text{Pore area(average pore area)}(\mu m^2) = \text{sum of pore areas/number of pores} \quad (2)$$

$$\text{Pore diameter(average pore diameter)}(\mu m) = (\text{average pore area}/\Pi)^{1/2} \quad (3)$$

In the present invention, the pore shape is not particularly limited; however, an elliptic or circular shape is preferred because, as can be seen from the above-described formula (3), the pore diameter is calculated from the area of the pore approximating a circle; accordingly, if the pore has a slit shape, a spindle shape, or an irregular shape, which are greatly different from a circle, the calculated value will greatly differ from the reality.

In the present invention, the fact that the dense layers are formed on the inner and outer surfaces, and the pore diameter at the inner surface is smaller than the pore diameter at the outer surface indicate that the fractionation performance and permeability are defined by the inner and outer surfaces. When treating an aqueous fluid through internal perfusion by cross-flow filtration, a shear force is generated by the fluid at the inner surface; thus, the accumulation of substances to be removed onto the surface is easily prevented. In this case, the above-described effect is enhanced by the dense layer formed on the surface. Further, when the portion on the rear side of the dense layer (support layer portion) is a sponge-like support layer having pores with larger diameters and a higher porosity, the resistance of the fluid is advantageously reduced; accordingly, the hollow fiber membrane is more likely to have higher permeability. In other words, it is preferable for the hollow fiber membrane to have a structure in which the inner surface is dense and the inside portion of the membrane is coarse. When the hollow fiber membrane has a coarse-dense structure, which is opposite to the above-described structure, substances to be removed will, undesirably, increasingly clog a thick portion of the membrane. However, due to the inevitable distribution of pore diameters, some substances to be removed will unavoidably pass through the membrane without being trapped. Accordingly, with a membrane whose fractionation performance is determined only by the thin dense layer formed on the inner surface, there are problems such that the fractionation performance becomes dull and the productivity of a hollow fiber membrane is sacrificed in order to obtain sharp fractionation performance.

The hollow fiber membrane of the present invention has dense layers on both the inner and outer surfaces, and thus the substances to be removed, which have passed through the dense layer on the inner surface, are trapped by the dense layer on the outer surface; i.e., the hollow fiber membrane has two fractionation areas. Thus, a sharper fractionation performance can be achieved.

In this regard, a portion of the membrane wall portion at which the porosity becomes the maximum is preferably present at a position which is slightly on the side of the inner surface from the center of the membrane wall. Because of such a structure, in the proximity of the inner surface, the slope of the pore diameter distribution from the surface toward the inside portion of the membrane wall becomes larger, and the layer that determines fractionation becomes thinner, thus contributing to the improvement of the permeability. At the same time, in the proximity of the outer surface, the slope of the pore diameter distribution from the inside portion of the membrane wall toward the surface becomes smaller. Thus, the effect of the depth filtration contributes to the improvement of fractionation.

The membrane characteristics of the hollow fiber membrane of the present invention are likely to be maintained because the dense layer is formed on the inner surface, and thereby the effect of a shear force by cross-flow filtration is exerted at the inner surface. Further, the hollow fiber membrane of the present invention is excellent in the recoverability of the membrane characteristics because the dense layer is formed on the inner surface of the dense-coarse-dense structure, and substances to be removed are thus easily removed during backwashing. Additionally, as described above, some substances to be removed probably still get trapped in the outer dense layer; however, trapped substances are easily removed because the washing solution flows in the direction from small pore diameter to large pore diameter during backwashing. Further, although the detailed mechanism is unknown, the washing solution in the inside portion of the membrane wall flows, probably because of the dense-coarse-dense structure, nonlinearly and at random, and the washing effect is thereby enhanced.

The pore diameter of the inner surface of the hollow fiber membrane of the present invention is preferably from 0.001 to 1 μm, more preferably from 0.01 to 0.5 μm, further preferably from 0.01 to 0.1 μm. When the pore diameter is too small, the permeability of the liquid may be reduced. On the other hand, when the pore diameter is too large, the strength of the membrane may be reduced.

Further, the porosity at the inner surface is preferably from 5 to 30%, more preferably from 5 to 20%, further preferably 5 to 15%. When the porosity is too small, the permeability may be reduced. Further, when the porosity is too large, the strength of the membrane may be reduced.

One of the characteristics of the hollow fiber membrane of the present invention is that the membrane wall portion has a portion having a maximum porosity portion. The pore diameter of the portion having a maximum porosity is larger than the pore diameter at the inner and outer surfaces, and is preferably 0.1 to 10 μm, more preferably 0.2 to 7 μm, further preferably 0.5 to 3 μm. When the pore diameter at the portion having a maximum porosity is too small, the slope of the membrane structure becomes gentle, which may lead to a degradation of the membrane characteristics and a reduction in the sustainability and recoverability of the membrane characteristics. When the pore diameter at the portion having the maximum porosity is too large, the strength of the membrane may be reduced.

The porosity in the portion having a maximum porosity is larger than the porosity in the inner and outer surfaces, and is preferably from 40 to 80%, more preferably from 45 to 70%. When the porosity is too small, the slope of the membrane structure becomes gentle, which may lead to a degradation of the membrane characteristics and a reduction in the sustainability and recoverability of the membrane characteristics. When the porosity in the portion having a maximum porosity is too large, the strength of the membrane may be reduced.

The pore diameter at the outer surface is not particularly limited, with 0.02 to 2 μm being preferable, 0.05 to 1.5 μm being more preferable, 0.08 to 1.0 μm being further preferable, and 0.1 to 0.5 μm being still further preferable. When the pore diameter is too small, the permeability may be reduced. When the pore diameter is too large, the strength of the membrane may be reduced.

The porosity in the outer surface is not particularly limited, with 5 to 30% being preferable, 7 to 22% being more preferable, and 7 to 15% being further preferable. When the porosity is too small, the permeability of the membrane is low, and adhesion between the adjacent hollow fiber membranes easily occurs. When the porosity is too large, the strength of the membrane may be reduced.

Note that the terms "porosity" and "pore diameter" used herein refer to the porosity determined in the above-described formula (1), and the average pore diameter determined in the above-described formulae (2) and (3), respectively.

The method of forming the basic structure of the hollow fiber membrane of the present invention is not limited in any way. An example thereof is as follows: a polymer, a solvent, and a non-solvent are mixed and dissolved, and the resulting solution is defoamed for use as a membrane-forming solution; the membrane-forming solution is discharged from an annular portion of a double tube nozzle, and an inner liquid is concurrently discharged from the center portion of the double tube nozzle; the discharged filaments are allowed to pass through an free running area (air gap area), and then introduced into a coagulating bath to foam a hollow fiber membrane; and the hollow fiber membrane is thereafter washed with water, and then wound up and dried.

The material of the hollow fiber membrane of the present invention is not limited. Examples thereof include cellulose, cellulose acetate, polymethyl methacrylate, polysulfone (PSf), polyethersulfone (PES), polyamide, polyethylene, polypropylene, polyvinylidene fluoride, etc. Polysulfone-based polymers such as polysulfone, polyethersulfone, etc. are particularly preferable because they can easily impart hydrophilicity, with polyvinylpyrrolidone (PVP), to the resulting filaments, and can also make the resulting filaments spinnable and sufficiently permeable.

In order to impart hydrophilicity to the hollow fiber membrane, the membrane-foaming solution may be supplemented with a hydrophilizing agent comprising, for example, polyethylene glycols, polyvinyl alcohols, polyvinylpyrrolidones (hereinafter abbreviated as PVPs), polymeric carbohydrates such as carboxymethyl cellulose, starch, and the like. Among these, the use of PVP is preferred because of its compatibility with polysulfone-based polymer and its time-proven applicability in a membrane for treating an aqueous fluid. These substances may be used alone, or in a combination of two or more. Regarding the molecular weight of PVP, PVP having a weight average molecular weight of 10,000 to 1,500,000 is preferably used. Specifically, PVP having molecular weights of 9,000 (K17), 45,000 (K30), 450,000 (K60), 900,000 (K80), and 1,200,000 (K90), which are commercially available from BASF, are preferably used.

Various solvents may be used for the membrane-forming solution insofar as they are good solvents for the polymer and hydrophilizing agent to be used. Examples thereof include N-methyl-2-pyrrolidone (hereinafter abbreviated as NMP), N,N-dimethylformamide (hereinafter abbreviated as DMF), N,N-dimethylacetamide (hereinafter abbreviated as DMAc), dimethylsulfoxide (hereinafter abbreviated as DMSO), ε-caprolactam, etc. When a polysulfone-based polymer such as PSf, PES or the like is used as the polymer, a solvent such as NMP, DMF or DMAc is preferably used, with NMP being particularly preferred.

The membrane-forming solution may contain a non-solvent to the polymer. Examples of the non-solvent to be used include ethylene glycol (hereinafter abbreviated as EG), propylene glycol (hereinafter abbreviated as PG), diethylene glycol (hereinafter abbreviated as DEG), triethylene glycol (hereinafter abbreviated as TEG), polyethylene glycol (hereinafter abbreviated as PEG), glycerol, water, etc. When a polysulfone-based polymer such as PSf or PES is used as the polymer, and PVP is used as the hydrophilizing agent, an ether polyol such as DEG, TEG or PEG is preferably used, with TEG being more preferred.

Although the concentration of the polymer used in the membrane-forming solution is not particularly limited insofar as a membrane can be formed from the solution, it is preferably 10 to 35 wt. %, more preferably 10 to 30 wt. %. The concentration of the polymer is preferably low to obtain a high permeability; however, an excessively low concentration may cause a reduction in the strength and fractionation performance of the membrane; accordingly, a concentration of 10 to 25 wt. % is preferred.

The amount of the hydrophilizing agent added is not limited insofar as it is sufficient to impart hydrophilicity to the hollow fiber membrane and to inhibit non-specific adsorption during the treatment of an aqueous fluid. The ratio of the hydrophilizing agent to the polymer is preferably from 10 to 30 wt. %, more preferably from 10 to 20 wt. %. When the amount of the hydrophilizing agent added is too small, the hydrophilicity-imparting effect to the membrane is insufficient, and the sustainability of the membrane characteristics may be reduced. Further, when the amount of the hydrophilic polymer added is too large, the hydrophilicity-imparting effect to the membrane is saturated, resulting in poor efficiency, and the phase separation (coagulation) of the membrane-forming solution tends to excessively proceed, which is disadvantageous in forming the preferable membrane structure of the present invention.

The ratio of the solvent to the non-solvent in the membrane-forming solution is an important factor for controlling the phase separation (coagulation) during a spinning step. Specifically, the content weight ratio of the solvent to the non-solvent is preferably from 30/70 to 70/30, more preferably from 35/65 to 60/40, further preferably from 35/65 to 55/45. When the content of the solvent is too small, the coagulation is facilitated; accordingly, the membrane structure may become too dense, resulting in a reduced permeability. When the content of the solvent is too large, the phase separation is excessively suppressed; accordingly, the pore diameter may become too large, resulting in a reduction in the fractionation performance and strength of the membrane.

In the preparation of the membrane, a membrane-forming solution free of foreign substances is preferably used in order to avoid defects in the membrane structure because of the inclusion of the foreign substances into the membrane. Specifically, using materials containing less foreign substances, filtering the membrane-forming solution to reduce foreign substances, and like other methods are effective. In the present invention, a filter having pores with diameters smaller than the thickness of the hollow fiber membrane is preferably used to filter the membrane-forming solution; afterward, the membrane-forming solution is discharged from a nozzle. Specifically, a uniformly dissolved spinning solution is allowed to pass through a sintered filter having pores with diameters from 10 to 50 μm during introducing the solution from the dissolution tank to the nozzle. Performing the filtration treatment at least once is sufficient; however, carrying out the filtration treatment in several stages is preferred because it improves the filtration efficiency and extends the filter lifetime. The pore diameter of the filter is preferably from 10 to 45 μm, more preferably from 10 to 40 μm. When the diameter of the pores of the filter is too small, a back pressure may increase, reducing the productivity.

Eliminating bubbles in the membrane-forming solution is also effective in order to obtain a hollow fiber membrane free of any defects. Defoamation of the membrane-forming solution is an effective method to prevent the inclusion of bubbles. Although it depends on the viscosity of the membrane-forming solution, the membrane-forming solution may be defoamed in a still state or under reduced pressure. In this case, the pressure in the dissolution tank is reduced in the range from 'a normal pressure-100 mmHg' to 'a normal pressure-750 mmHg', and the dissolution tank is then sealed and left to stand for 30 to 180 minutes. This operation is repeated several times to defoam the membrane-forming solution. When the degree of reduced pressure is too low, the number of operations to defoam the membrane-forming solution needs to be increased, which may consequently require a longer time for treatment. When the degree of reduced pressure is too high, the cost to increase the sealing degree of the system may become higher. Preferably, the total treatment time is from 5 minutes to 5 hours. When the treatment time is too long, the components of the membrane-forming solution may be decomposed or degraded under the influence of a reduced pressure. When the treatment time is too short, the defoaming effect may be insufficient.

As the composition of the inner liquid to be used to form the hollow fiber membrane, it is preferable to use a mixture of water with the same solvent and non-solvent as those contained in the membrane-forming solution. The ratio of the solvent to the non-solvent contained in the inner liquid is preferably the same as the ratio of the solvent to the non-solvent in the membrane-forming solution. Preferably, the solvent and the non-solvent, which are the same as those used in the membrane-forming solution, are mixed in the same ratio as that of the membrane-forming solution, and the resulting mixture is admixed and diluted with water for use. Forming the membrane-foaming solution and the inner liquid with the same solvent/non-solvent composition can reduce the raw material procurement and production costs, as well as the handling difficulty.

The content of water in the inner liquid is normally from 10 to 40 wt. %, preferably from 15 to 30 wt. %. When the content of water is too large, the coagulation of the membrane-forming solution is facilitated, so that the membrane structure may become too dense, resulting in a reduced permeability. When the content of water is too small, the phase separation of the membrane-forming solution is excessively suppressed, so that the formation of pores with larger diameters may be facilitated, resulting in a reduction in the fractionation performance and strength of the membrane.

In the present invention, one of the factors for controlling the membrane structure is a temperature of a nozzle. When the temperature of a nozzle is too low, the coagulation of the membrane-forming solution is facilitated, so that the membrane structure may become too dense, resulting in a reduced permeability. When the temperature is too high, the phase separation of the membrane-forming solution is excessively suppressed, so that the formation of pores with larger diameters may be facilitated, resulting in a reduction in the fractionation performance and strength of the membrane. Accordingly, the nozzle temperature is preferably from 30° C. to 90° C., more preferably from 40° C. to 80° C.

In the present invention, the residence time during which the membrane-forming solution discharged from the nozzle is resident at the air gap area is one of the possible factors for controlling the membrane structure. When the residence time is too short, the membrane-forming solution, in which growth of agglomerated particles due to the phase separation of the solution at the air gap area is suppressed, is quenched by the external coagulating liquid, so that the outer surface of the membrane may become too dense, resulting in a reduced permeability. The resulting hollow fiber membranes tend to adhere to one another because of the densified outer surface. When the residence time is too long, the membrane is more likely to have pores with larger diameters, which may cause a reduction in the fractionation performance and strength of the membrane. The residence time at the air gap area is preferably from 0.05 to 4 seconds, more preferably from 0.1 to 3 seconds.

The hollow fiber membrane, after having passed through the air gap area in a relatively short residence time, is introduced into the coagulating bath to contact the external coagulating liquid having a relatively mild coagulating property while the coagulation of the hollow fiber membrane by the inner liquid proceeds and the external coagulation thereof is being inhibited to a certain degree. In other words, the hollow fiber membrane that has just entered the coagulating bath is in an "alive" state, and thus does not have a completely defined structure. The "alive" hollow fiber membrane is completely coagulated in the coagulating bath, structurally defined, and then pulled up from the coagulating bath. As described above, the coagulating property of the external coagulating liquid is relatively mild, and thus a sufficient residence time is needed for the hollow fiber membrane to be completely coagulated in the coagulating bath. Specifically, the residence time is preferably from 5 to 20 seconds, more preferably from 10 to 20 seconds. When the residence time in the coagulating bath is too short, the coagulation of the hollow fiber membrane may be insufficient. When the residence time in the coagulating bath is too long, the membrane-forming rate may be reduced, or a larger coagulating bath may be needed.

As the composition of the external coagulating liquid, it is preferable to use a mixture of water with the same solvent and non-solvent as those contained in the membrane-forming solution. The ratio of the solvent to the non-solvent contained in the external coagulating liquid is preferably the same as the ratio of the solvent to the non-solvent in the membrane-forming solution. The solvent and the non-solvent, which are the same as those used in the membrane-forming solution, are mixed in the same ratio as that of the membrane-forming solution, and the resulting mixture is admixed and diluted with water for use. Making the solvent/non-solvent composition uniform in the membrane-forming solution, the inner liquid, and the external coagulating liquid can result in the inhibition of the compositional change of the external coagulating liquid, and is thus preferred in terms of the production cost and management.

The content of water in the external coagulating liquid is preferably from 30 to 85 wt. %, more preferably from 40 to 80 wt. %. When the content of water is too large, the coagulation of the membrane-forming solution rapidly proceeds; accordingly, the membrane structure may become too dense, resulting in a reduced permeability. When the content of water is too small, the phase separation of the membrane-forming solution is excessively suppressed; accordingly, the formation of pores with larger diameters may be facilitated, resulting in a reduction in the fractionation performance and strength of the membrane.

When the temperature of the external coagulating liquid is too low, the coagulation of the membrane-forming solution rapidly proceeds; accordingly, the membrane structure may become too dense, resulting in a reduced permeability. When the temperature is too high, the phase separation of the membrane-forming solution is excessively suppressed; accordingly, the formation of pores with larger diameters may be facilitated, resulting in a reduction in the fractionation performance and strength of the membrane. Accordingly, the temperature of the external coagulating liquid is preferably from 30° C. to 80° C., more preferably from 40° C. to 70° C.

The main characteristics of the hollow fiber membrane of the present invention is that the hollow fiber membrane has a structure in which the dense layers are formed on the inner and outer surfaces; the pore diameter at the inner surface is smaller than the pore diameter at the outer surface; and the porosity initially increases from the inner surface toward the outer surface, becomes maximum in at least one portion, and thereafter decreases toward the outer surface. In order to achieve the structure as described above, it is desirable to use the above-described membrane-forming solution and employ the method of obtaining a hollow fiber membrane under the above-described spinning conditions. In order for the hollow fiber membrane to have a dense-coarse-dense asymmetric structure in the direction from the inner surface toward the outer surface, the coagulation of the membrane from both the inner and outer surfaces toward the inside portion of the membrane wall must be controlled by balancing and antagonizing the coagulation of the membrane from the inner surface (the phase separation and coagulation of the membrane mainly by the inner liquid) and the coagulation of the membrane from the outer surface (the phase separation and coagulation of the membrane mainly by the air gap area and the external coagulating liquid). The effective controlling means therefor are the composition of the inner liquid, the composition of the external coagulating liquid and the temperature thereof, the residence time in the air gap area, and the residence time in the coagulating bath. The characteristic membrane structure of the present invention can be obtained by specifying these conditions within the above-described ranges.

Obtaining the hollow fiber membrane of the present invention requires subtle control of the coagulation proceeding from both the inner and outer surfaces of the membrane. In this control, careful attention must be paid to the bending of the hollow fiber membrane in the coagulating bath. In the dry-wet type spinning method, a membrane-forming solution is generally discharged in a gravitational direction from a nozzle facing downward, and introduced into a coagulating bath through an air gap area; the feeding direction of the membrane is changed to an upward direction in the coagulating bath to pull up the membrane from the coagulating bath; and the membrane is washed in a water-washing bath and is then wound up. The hollow fiber membrane of the present invention is in an "alive" state in which the membrane structure is not completely defined immediately after the membrane has entered the coagulating bath; therefore, the membrane structure may be damaged or destroyed when the feeding direction of the membrane is rapidly changed in the coagulating bath. Specifically, the radius of curvature for changing the feeding direction is from 20 to 300 mm, preferably from 30 to 200 mm, more preferably from 40 to 100 mm, still further preferably from 40 to 70 mm. It is also preferred to use a multipoint guide to gradually change the feeding direction at a plural number of points.

In the formulation of the hollow fiber membrane of the present invention, it is preferable not to substantially stretch the hollow fiber membrane before the structure of the membrane is completely fixed. The phrase "not to substantially stretch" means that the speeds of rollers for use in the spinning step are controlled so that a filament of the spinning solution discharged from the nozzle is not loosened or overly tight. The ratio of the linear discharge speed to the speed of the first roller in the coagulating bath (draft ratio) is preferably in the range of from 0.7 to 1.8. When the draft ratio is too low, the hollow fiber membrane being fed tends to loosen, leading to poor productivity. Therefore, the draft ratio is more preferably 0.8 or more, further preferably 0.9 or more, and still further preferably 0.95 or more. When the draft ratio is too high, the membrane structure may be destroyed, as in the case, for example, where the dense layers of the hollow fiber membrane are torn. Therefore, the draft ratio is more preferably 1.7 or less, further preferably 1.6 or less, still further preferably 1.5 or less, and particularly preferably 1.4 or less. Controlling the draft ratio within the above-described range can prevent deformation or destruction of fine pores, thus allowing the membrane to exhibit the sustainability of the membrane performance and sharp fractionation performance.

The spinning speed is not particularly limited insofar as a hollow fiber membrane with no defects can be obtained and high productivity can be ensured. The spinning speed is preferably from 5 to 30 m/minutes, more preferably from 7 to 20 m/minutes. When the spinning speed is too low, the productivity may be reduced. When the spinning speed is too high, the cost tends to disadvantageously increase because a larger coagulating bath is needed to complete the coagulation, or the amount of the external coagulating liquid flowed out from the coagulating bath is increased.

After passing through the coagulating bath, the hollow fiber membrane is washed in a washing step. The method for washing the hollow fiber membrane is not limited. In view of the washing effect, safety and convenience, the hollow fiber membrane is preferably washed with warm water. The temperature of the warm water to be used is preferably from a room temperature to 100° C., more preferably from 30° C. to 90° C. When the temperature of the warm water is too low, the washing effect may be insufficient. When the temperature is too high, it may cause adverse effects, such as the water for washing being boiled and PVP, which is a component of the hollow fiber membrane, being degraded.

After the washing step, the hollow fiber membrane is wound up in a bundle by a wind-up machine, and then cut to a specific length to obtain a bundle of hollow fiber membranes. Further, in order to enhance the washing effect in a subsequent heat treatment step, the bundle of hollow fiber membranes obtained by cutting is preferably vertically stood for several tens of seconds to remove the inner liquid remaining in the hollow portion, which is removed simply by the pull of gravity.

After washing, the hollow fiber membrane is preferably subjected to a heat treatment so as to inhibit a change in the membrane characteristics in use or due to the washing operation, and to ensure the sustainability, stability and recoverability of the membrane characteristics. The heat treatment is carried out by immersing the hollow fiber membrane in hot water. Thereby, the solvent and the non-solvent remaining in the hollow fiber membrane, if there are any, are also expected to be washed off and removed. Further, the heat treatment produces a secondary effect in that the adhesion between hollow fiber membranes is inhibited in a subsequent drying step because excessive PVPs that are present in the outer surface of the hollow fiber membrane can be removed. The temperature of the hot water is preferably from 60° C. to 100° C., more preferably from 70° C. to 90° C.; and the treatment time is preferably from 30 to 120 minutes, more preferably from 40 to 90 minutes, still further preferably from 50 to 80 minutes. When the temperature of the hot water is too low or when the treatment time is too short, heat history applied to the hollow fiber membrane becomes insufficient, and thus the sustainability and stability of the membrane characteristics may be reduced. Additionally, the washing effect becomes insufficient, and thus the amount of eluted substance may be increased. When the temperature of the hot water is too high or when the treatment time is too long, the water may be boiled, or the productivity may be reduced because a longer time is required for the treatment. The bath ratio of the hollow fiber membrane to the hot water is not particularly limited insofar as the hollow fiber membrane can be sufficiently immersed in the hot water. However, the use of an excessive amount of hot water may reduce the productivity.

Examples of a method of contacting fine pores of the hollow fiber membrane with good solvent for the polymer at a concentration of 10 to 35 wt. % for 10 to 120 minutes include a method in which the hollow fiber membrane is immersed in an aqueous solution of good solvent having 10 to 35 wt. % before proceeding to the heat treatment step by hot water; and a method in which the concentration of good solvent in the hollow fiber membrane is adjusted to be within a range of from 10 to 35 wt. % by controlling conditions such as liquid temperature, feeding speed, liquid flow amount, etc. in the coagulating bath and the washing step. Additionally, the hollow fiber membrane may be treated by feeding good solvent at a concentration of 10 to 35 wt. % to at least fine pores of the hollow fiber membrane for 10 to 120 minutes in a coagulating step and the washing step; however, this method requires large-scale production equipment. Thus, the following method is preferable because it is simpler in terms of production: the coagulating step and the washing step are shortened; the hollow fiber membrane wherein the concentration of the good solvent is 10 to 35 wt. % is wound up in a bundle after washing; and the bundle is left to stand for 10 to 120 minutes. The good solvent in this case refers to, for example, a solvent having compatibility with polymers such as PSf and PES, and also with hydrophilizing agents such as PVP. Examples thereof include solvents such as NMP, DMF, DMAc, etc. Non-solvents such as EG, PG, DEG, TEG, PEG, glycerol, water, etc. are not included. Additionally, the good solvent does not need to be contained in the hollow portion insofar as good solvent is at least contained in fine pores of the hollow fiber membrane.

The concentration of good solvent is more preferably 15 to 30%, and the good solvent is preferably left to stand for 20 to 120 minutes, more preferably for 30 to 60 minutes. When the concentration is too low or when the time is too short, the inner surface of the membrane may not change, failing to sufficiently inhibit the formation of cake layer. On the other hand, when the concentration is too high or when the time is too long, the membrane structure may change. When the time is even longer, the production efficiency may be reduced.

The hollow fiber membrane that underwent the heat treatment is dried, and is thus completed. A variety of conventional drying methods such as air drying, reduced-pressure drying, hot air drying, etc. can be used as the drying method. Microwave drying, which recently has been employed to dry a blood treatment membrane, can also be used. However, the hot air drying is preferably employed because a large number of hollow fiber membranes can be efficiently dried in a simple apparatus. By subjecting the hollow fiber membrane to the above-described heat treatment before drying, a change in the membrane characteristics caused by the hot air drying is suppressed. The temperature of hot air in the hot air drying is not particularly limited: it is preferably 40° C. to 100° C., more preferably 50° C. to 80° C. An overly low drying temperature may require a longer time to dry the membrane. An overly high drying temperature reduces the performance and quality of the membrane, and increases the cost of energy to generate hot air.

In the present invention, the formula, $5 \leq (|B|-|A|)/\text{membrane thickness} \times 100 \leq 20$, is satisfied by the relationship among A, B, and the membrane thickness, wherein A is the depression amount of the hollow fiber membrane when a load of 0.6 N is applied to the inner face of the hollow fiber membrane, and B is the depression amount of the same when a load of 1.0 N is applied to the same, which are measured by a thermo-mechanical analyzer. Satisfying the above formula results in a hollow fiber membrane for treating liquids with high filtration performance of a wine yeast liquid, reduced clogging during the filtration, and also excellent recoverability of the membrane performance by washing.

The degree of depression in the inner surface measured by a thermo-mechanical analyzer when a load is applied to the inner face of the hollow fiber membrane of the present invention is now described. The thermo-mechanical analysis is used to measure the change of form in response to the temperature change of the sample under a nonoscillatory load. In the present invention, a probe is pressed vertically against the sample, i.e., the inner surface of the hollow fiber membrane, at a temperature of 25° C., to apply a load thereto, and a depression is thereby formed in the inner surface of the hollow fiber membrane. The amount of displacement by the depression is measured as the amount of change in the location of the probe. In other words, the softness of the inner surface of the membrane can be measured.

As a result of intensive studies, the present inventors found that a hollow fiber membrane that is excellent in the permeability of a fermented liquid such as wine and that is less likely to be clogged during the filtration can be provided by measuring, using a thermo-mechanical analyzer, the amount of depression formed in the inner surface when a probe is pressed thereagainst; defining this depression amount to be a depression amount of the inner surface relative to the membrane thickness; and specifying the depression amount to be within a specific range.

When suspensions such as a fermented liquid and the like are filtered, a cake layer is usually formed on the surface of the filtering material immediately after the start of the filtration. As the operation pressure during the filtration is increased, the cake layer becomes thicker. Consequently, a sufficient filtration flow amount cannot be obtained. The filtration flow amount is rapidly reduced particularly in dead-end filtration, because the filtration cake layer grows as the filtration proceeds. Contrarily, when fermented liquids such as wine, beer, etc. are filtered using a hollow fiber membrane, these fermented liquids are usually filtered from the inside to the outside of the hollow fiber membrane at a filtration pressure of 1 to 1.5 bars. In order to prevent the cake layer from becoming thick, cross-flow filtration is employed to inhibit the growth of cake layer. In cross-flow filtration, fermented liquids are filtered by being fed from the inlet to the outlet of a hollow fiber membrane module at a high speed (at a linear speed of 1 m/second or higher).

However, even in cross-flow filtration, the growth of cake layer cannot be completely inhibited. The amount of treatment is gradually reduced along with the passage of the filtration time. However, suitable softness is imparted to the inside of the hollow fiber membrane of the present invention, and thereby the filtration performance per unit area of the hollow fiber membrane is high, and clogging during the filtration is reduced; i.e., the time-dependent degradation of the performance is maximally inhibited. Although the detailed reason is unknown, the inside of the membrane acts as a cushion and repels accumulation of cake layer, likely because suitable softness is imparted to the inside of the hollow fiber membrane.

In other words, preferably, the formula $5 \leq (|B|-|A|)/\text{membrane thickness} \times 100 \leq 20$, is satisfied by the relationship among A, B, and the membrane thickness of the hollow fiber membrane of the present invention, wherein A is the depression amount of the hollow fiber membrane when a load of 0.6 N is applied to the inner face of the hollow fiber membrane, and B is the depression amount of the same when a load of 1.0 N is applied to the same, which are measured by a thermo-mechanical analyzer. More preferably, the formula $5 \leq (|B|-|A|)/\text{membrane thickness} \times 100 \leq 17$, is satisfied. The reason why the loads are 0.6 N and 1.0 N is because the difference in the depression amount caused by the difference in the materials or the membrane structure will not be produced when the load is lower than 0.6 N (see FIG. 8); it is also because the depression amount becomes high regardless of the difference in the material or the membrane structure when the load is larger than 1.0 N. Further, for example, while a pressure of 1 to 1.5 bars is usually applied to the membrane when filtering wine, the softness of the membrane is evaluated by applying a load several times higher than the above-mentioned pressure so as to indicate a high level of stability of the filtration. An overly low depression amount indicates that the inside of the membrane is hard. In this case, the growth of cake layer cannot be sufficiently suppressed, and thus the time-dependent reduction in the wine filtration flow amount may not be avoided. On the other hand, when the depression amount is too large, the strength of the membrane is reduced, possibly resulting in the leakage of the membrane during use.

Figure 9:
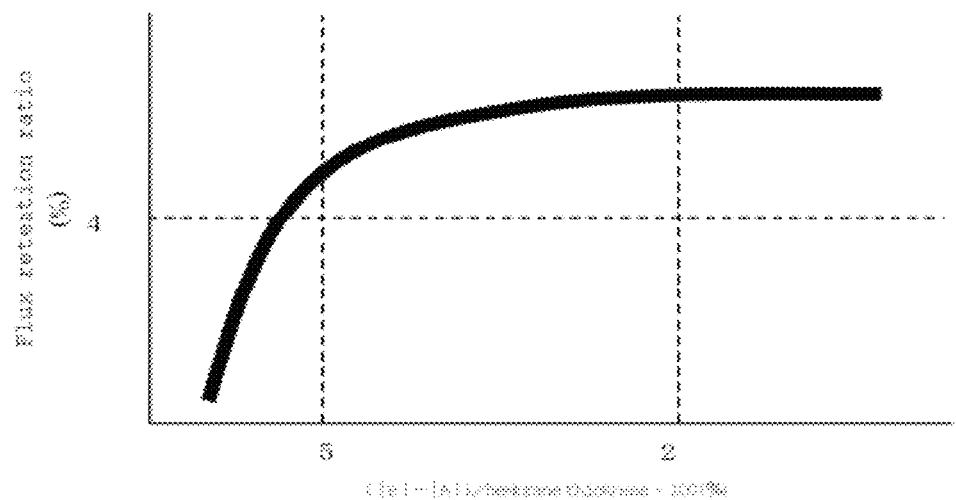
FIG. 9 is a diagram showing a relationship between depression rate and flux-sustaining rate.
Figure 10:
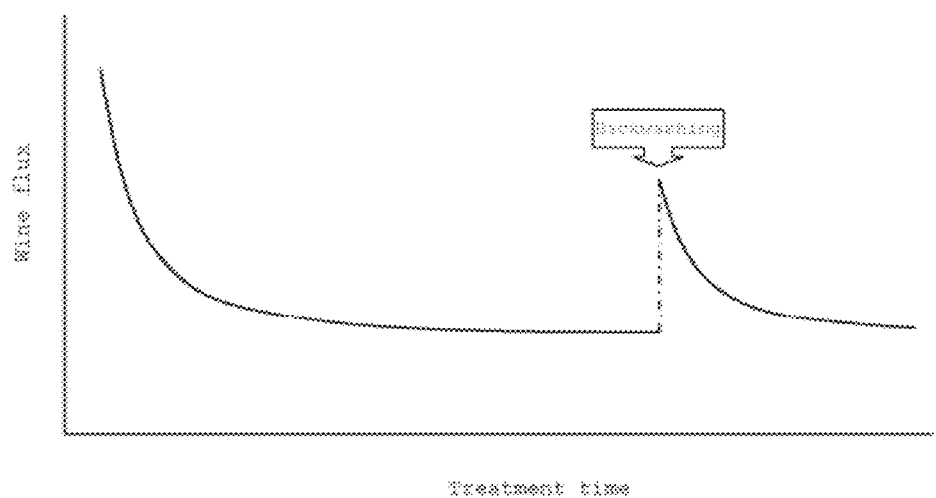
FIG. 10 is a diagram showing a relationship between filtration time and flux.

FIG. 9 is a diagram showing a general tendency of a relationship between flux and the formula (|B|−|A|)/membrane thickness×100.

In this regard, a process of treating a wine-fermented liquid using a separation membrane is briefly described as an example. Once the wine-fermented liquid is flowed through a separation membrane and the filtration starts, the flux is reduced over time. This is an inevitable phenomenon. The time-dependent reduction in the flux is caused by the organic substances such as yeast, fine particles, protein, etc. in the fermented liquid being condensed near the membrane surface. Usually, backwashing is performed to recover the flux. However, because an increase in the frequency of backwashing leads to a reduction in the operational efficiency and an increase in the cost, an acceptable frequency of backwashing is about one every 2 to 5 hours, based on the demands from wine producers and the market. In response to such demands from the market, the inventors of the present invention worked on the improvement of the membrane with the objects of maximally inhibiting the time-dependent reduction in the flux, and increasing flux recovery by backwashing.

In other words, the present inventors found that it is possible to ensure the amount of treatment of suspensions such as wine, reduce the frequency of backwashing, and provide excellent flux recovery if a flux retention ratio expressed by a ratio of Flux 120 (flux 120 minutes after the start of the filtration) to Flux 30 (flux 30 minutes after the start of the filtration) is about 45% or higher. A hollow fiber membrane having the above-described characteristic, i.e., (|B|−|A|)/membrane thickness×100 is 5 to 20%, can exhibit the above-described performances. Note that, when a value of (|B|−|A|)/membrane thickness×100 is too high, the membrane may become too soft. As described above, a weak membrane may cause problems such as the leakage of the membrane during use.

As described above, when the hollow fiber membrane is in a bundled state after winding and before cutting, or when a bundle of hollow fiber membranes has been formed after cutting, fine pores of the hollow fiber membrane are at least contacted with good solvent for the polymer under specific conditions before proceeding to the heat treatment step by hot water. Thereby, the bonding between polymer particles in the hollow fiber membrane becomes loose, imparting suitable softness to the membrane. It is assumed that the formation of cake layer on the membrane surface is probably inhibited during cross-flow filtration of suspensions because of the suitable softness of the hollow fiber membrane of the present invention. In other words, the accumulation of fine particles is probably repelled because of the cushioning effect of the membrane surface.

DESCRIPTION OF EMBODIMENTS

Examples

The effects of the present invention are more specifically explained with reference to Examples and Comparative Examples. However, the present invention is not limited to these examples. The following evaluation method was used in the Examples.

1. Observation of the Structure of a Hollow Fiber Membrane with an Electron Microscope A dried hollow fiber membrane was cut, and the inner and outer surfaces and the cross section of the hollow fiber membrane were photographed with a scanning electron microscope (SEM) with magnifications of 150×, 1,000×, 3,000× and 10,000×.

2. Production of a Miniature Module

A hollow fiber membrane was cut into pieces with lengths of about 40 cm, which were bundled at their both ends with a vinyl tape to obtain a bundle of hollow fiber membranes. Both ends were squashed with pliers so that the end portion of the hollow fiber membrane was opened after the adhesion. Both ends of the bundle of hollow fiber membranes were separately inserted into pipes (sleeves), and an epoxy adhesive agent was poured into the pipes. After the epoxy resin was cured, the end portions of the bundle of hollow fiber membranes were cut to obtain a miniature module which was opened at its both ends. The number of the hollow fiber membranes was appropriately selected so that the surface area of the inner surfaces of the membranes falls within a range of from 50 to 100 cm².

3. Production of a Module

A hollow fiber membrane was cut into pieces with lengths of about 30 cm, which were wrapped in a polyethylene film to obtain a bundle of hollow fiber membranes. This bundle of the hollow fiber membranes was inserted into a cylindrical polycarbonate module casing, and was hardened at its both ends with a urethane potting agent. The end portions of the bundle were cut to obtain a module opened at its both ends. The number of the hollow fiber membranes was appropriately selected so that the surface area of the inner surfaces of the membranes becomes about 200 cm². The cylindrical module casing had ports at two portions of its cylindrical surface to thereby perfuse the outer surfaces of the hollow fiber membranes with a fluid. The cylindrical module casing was capped at its both ends to perfuse the inner surfaces of the hollow fiber membranes with the fluid.

4. Production of a Loop-Shaped Miniature Module

A hollow fiber membrane was cut into pieces with lengths of about 40 cm, which were bundled in loop-like fashion and fixed at their ends with a vinyl tape. After squashing the both ends with pliers so that the end portion of the hollow fiber membrane was opened after the adhesion, the end portions of the loop-shaped bundle of the hollow fiber membranes were inserted into a pipe (a sleeve). An epoxy resin agent was poured into the pipe. After the epoxy resin was cured, the end portions of the bundle were cut to obtain a loop-shaped miniature module that was opened at its both ends. The number of the hollow fiber membranes was appropriately selected so that the surface area of the inner surfaces of the membranes falls within a range of from 20 to 50 cm².

5. Calculation of Membrane Area

The membrane area of a module was calculated based on the inner diameter of the hollow fiber membrane. The membrane area of the module was calculated by the following equation [9]:

$$A = n \times \Pi \times d \times L$$

wherein n is the number of the hollow fiber membranes; Π is the ratio of the circumference of a circle to its diameter; d is the inner diameter [m] of the hollow fiber membrane; and L is the effective length [m] of the hollow fiber membrane in the module.

6. Measurement of Bubble Point and Calculation of Maximum Pore Diameter

A loop-type miniature module was completely immersed in a sufficient amount of 2-propanol (hereinafter referred to as iPA) for one hour or longer, and iPA was allowed to infiltrate the inner hollow portions and the wall portions of the hollow fiber membranes. When all of the hollow fiber membranes in the loop-type module were immersed in iPA, the sleeve was connected to a nitrogen line equipped with a pressure indicator so as to monitor an applied pressure. The loop-type module was then compressed at a rate of 1 bar per min. A pressure point of time at which bubbles had started to be constantly emitted from the wall portions of the hollow fiber membranes was recorded as a bubble point P [bar]. Measurement of bubble point was performed three times for each sample, and an average value of the measured values of the bubble points was defined as a bubble point relative to the sample. Further, the maximum pore diameter d was calculated from the bubble point (P [bar]) which was measured using iPA, by the following equation:

$$d[\mu m] = 0.0286 \times 22.9/P$$

7. Measurement of Pure Water Flux

A circuit was connected to the two portions of the pipes (hereinafter referred to as the inner inlet and the inner outlet, respectively) at the both ends of the miniature module so as to measure an inflow pressure of pure water to the module and an outflow pressure of the pure water from the module. Pure water was introduced into the module from its inner inlet, the flow of the pure water was stopped by pinching the circuit connected to the inner outlet of the module (a downstream side from a pressure-measuring point), and all of the pure water introduced from the inner inlet of the module was filtered. Pure water maintained at 22° C. was poured into a compression tank and supplied to the miniature module while the pressure was being controlled with a regulator. The amount of the filtrate outflowing from the fluid outlet of the module during a given period was measured. The transmembrane pressure (TMP) was calculated by the following equation:

$$TMP = (Pi + Po)/2,$$

wherein Pi was a pressure at the inner inlet of the module; and Po was a pressure at the inner outlet of the module.

The pure water flux of the hollow fiber membranes was calculated from the membrane area and the water permeability of the module:

Pure water flux[L/m$^2$/h/bar]=(permeability of pure water per min.[L/min]×60/A/TMP[bar]

wherein the pure water flux was the water permeability [L/m$^2$/h/bar] of the hollow fiber membranes; and A was the membrane area [m$^2$] of the module.

8. Measurement of Flux 30 and Flux 120

An unrefined wine containing a yeast ("Tamba Shinshu NIGORI 2005": commercial product of Tamba Wine Ltd.) was allowed to stand for at least one day. Then, the supernatant was diluted with "Wine Life (Red)" (commercial product of Mercian Corporation) so that the turbidity became 20 NTU (the resulting mixture is hereinafter referred to as an evaluation wine). After a module was immersed in RO water at least for one hour, the water was replaced with the evaluation wine so that both the inner and outer surfaces were immersed in the evaluation wine. A container was filled with the evaluation wine, which was kept at 22° C. A circuit was constructed so as to perfuse the inner portion of the module with the evaluation wine supplied from the container via a pump and then send the wine back to the container, while simultaneously sending the evaluation wine filtrated by the hollow fiber membrane back to the container. During this flow, an inflow pressure of the evaluation wine to the module and an outflow pressure of the evaluation wine from the module were measured. The evaluation wine was introduced into the module from its inner inlet so as to perfuse the inner hollow portion of the hollow fiber membrane with the evaluation wine at a flow speed of 1.5 m/sec. The TMP was adjusted to about 1.5 bar. Under such conditions, cross-flow filtration was repeated by perfusing the internal hollow portion of the hollow fiber membrane with the evaluation wine while filtrating a part of the wine. After a certain time had passed, the amount of the filtrated wine during a given period was measured (e.g., the filtration amount after 10 to 11 min. or 20 to 21 min. from the beginning of the perfusion). Flux was calculated according to the following formula.

Flux[L/m$^2$/h/bar]=(amount of filtrated wine per min. [L/min]×60/A/TMP[bar]

wherein A is a membrane area [m$^2$] of the module.

9. Measurement of Inner Diameter and Thickness of Hollow Fiber Membrane

A hollow fiber membrane was cut with a sharp-edged razor vertically in its lengthwise direction, and the section of the hollow fiber membrane was observed with a microscope at a magnification of 20×. The inner diameters and the outer diameters of the hollow fiber membranes (n=10) were measured to find average values of the inner and outer diameters:

The thickness of the membrane[μm]={(the outer diameter)−(inner diameter)}/2

10. Measurement of Sample for Thermo-Mechanical Analysis

A hollow fiber membrane was cleaved with a sharp-edged razor, and opened with tweezers. With the inner membrane exposed to the surface, the hollow fiber membrane was directly adhered to a TMA stage and fixed thereto. A 40% alcohol aqueous solution was dropped into the surface of the sample. After a minute, the surface was roughly dried with a Kimwipe. Thereafter, pure water was dropped into the sample. The sample was allowed to stand for three minutes to be used as the sample for thermo-mechanical analysis.

The thermo-mechanical analyzer used herein was a Q400 analyzer (TA Instruments). A needle-type probe (0.9 mm in diameter) supplied from the manufacturer was brought into contact with the surface of the sample at 25° C. under a load of 0.005 N to start the measurement. The measurement was carried out by increasing the contact load of the probe to 1.2 N, at a rate of 0.1 N/min., and measuring changes in depression amount of the inner surface of the hollow fiber membrane relative to its thickness.

11. Calculation of Depression Rate of Inner Surface of Hollow Fiber Membrane

Figure 8:
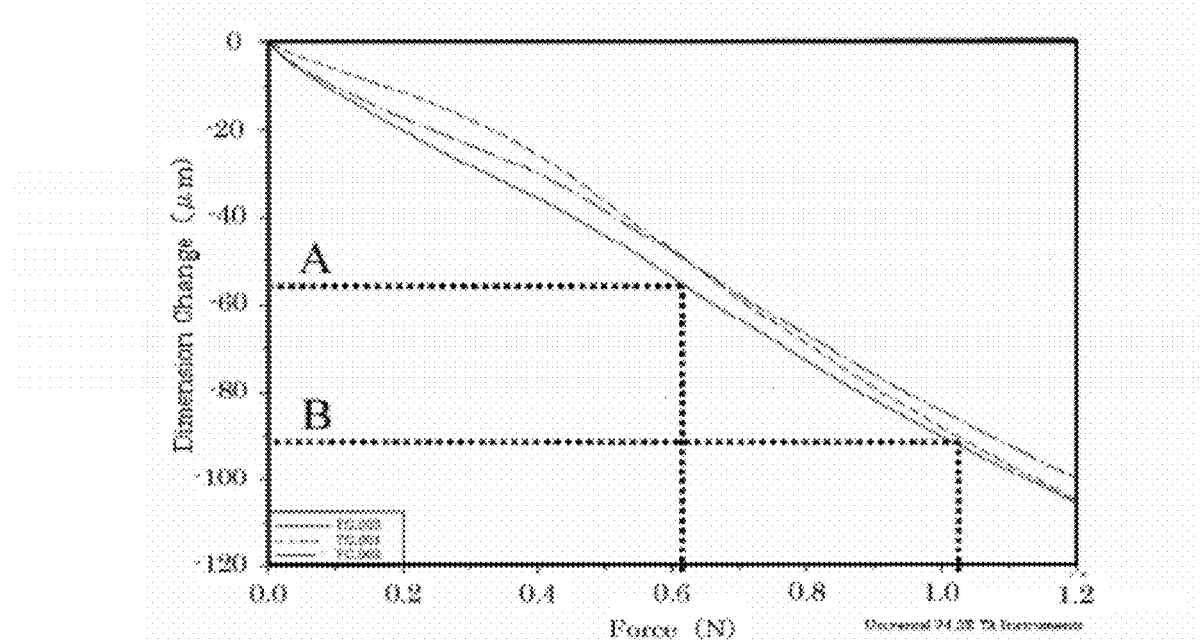
FIG. 8 is a graph showing depression amounts measured by a thermo-mechanical analyzer.

FIG. 8 shows an example of the results of the measurement using a thermo-mechanical analyzer. The horizontal axis shows a load applied to the probe, and the vertical axis shows the depression amount of the inner surface of the hollow fiber membrane. The change in depression amount of the inner surface of the hollow fiber membrane relative to its thickness, under a load of 0.6 to 1.0 N, can be found according to the following formula.

(|B|−|A|)/membrane thickness×100(%)

wherein A represents depression amount under a load of 0.6 N, and B represents depression amount under a load of 1.0 N.

12. Measurement of Porosity and Pore Diameter

Porosity and pore diameter of the membrane can be measured by bringing up SEM images of a dry membrane in a computer, and carrying out numeric conversion of the image using image analysis software. More specifically, the porosity and pore diameter can be obtained from the sum of the respective pore areas in the fetched image, the areas of the respective pore portions and the number of the pore portions. The porosity of the membrane can be calculated by the equation [1], and the pore diameter (average pore diameter) can be calculated by the equations [2] and [3].

$$\text{Porosity}[\%] = 100 \times (\text{the sum of the areas of the pore portions/the total area of the read image}) \quad [1]$$

$$\text{Area of the pore(average pore area)}[\mu m^2] = \text{the sum of the areas of the pore portions/the number of the pore portions} \quad [2]$$

$$\text{Pore diameter(average pore diameter)}[\mu m] = (\text{average pore area}/\pi)^{1/2} \quad [3]$$

Example 1

PES (Sumika EXCEL® 4800P manufactured by Sumitomo Chemtex) (19.0 wt. %), PVP (Kolidone® K30 manufactured by BASF) (3.0 wt. %), NMP manufactured by Mitsubishi Chemical Corporation (35.1 wt. %) and TEG manufactured by MITSUI CHEMICALS, INC. (42.9 wt. %) were mixed and dissolved at 80° C. for four hours to form a homogenous solution. The obtained solution was decompressed at from an atmospheric pressure to −700 mmHg. Immediately afterward, the system was sealed so as not to change the composition of the solution due to the volatilization of the solvent or the like, and the solution was left to stand for two hours so as to be defoamed. The resulting solution was used as a membrane-forming solution. A mixture of NMP (34.875 wt. %), TEG (42.675 wt. %) and RO water (22.5 wt. %) was prepared as an inner liquid. The membrane-forming solution and the inner liquid were discharged from the annular portion and the center portion of a double tube nozzle, respectively; afterward, the resultant filament was allowed to pass through an air gap with a length of 20 mm, and was then introduced into a coagulating bath filled with an external coagulating liquid consisting of a mixture of NMP (13.5 wt. %), TEG (16.5 wt. %) and RO water (70.0 wt. %). In this operation, the nozzle temperature was 72° C., and the temperature of the external coagulating liquid was 55° C. In the coagulating bath, three cylindrical guides with diameters of 50 mm were arranged to gradually change the feeding direction of the hollow fiber membrane to pull it up from the coagulating bath. The immersion depth for the hollow fiber membrane in the coagulating bath was a maximum of 800 mm, and the feeding distance for the hollow fiber membrane in the same bath was 2,000 mm. The resulting hollow fiber membrane was drawn from the coagulating bath, passed through a water-washing bath for 45 seconds to remove the extra solvent, and was wound into a skein at a rate of 8.5 m/min. The wound hollow fiber membrane was allowed to stand for 40 minutes before being cut into pieces of predetermined lengths to form a bundle of fibers. Then, the bundle was vertically disposed to remove liquids from the hollow portions of the hollow fiber membranes. Here, in the hollow fiber membranes, the amount of NMP (good solvent) was 20.2 wt. %, while the amount of TEG (nonsolvent) was 26.0 wt. % The bundle was immersed in RO water at 80° C. for 60 minutes for heat treatment. After that, the bundle was dried with hot air at 60° C. for 10 hours to obtain hollow fiber membranes with an inner diameter of 1,185 μm and a thickness of 354 μm.

A module was formed using the obtained hollow fiber membranes, and flux was measured. According to Flux 30 and Flux 120, the sustainability (%) was found according to Flux120/Flux30×100. The measured value was 67%, showing a high sustainability. The recoverability by washing was also high, i.e., 95%.

Figure 2:
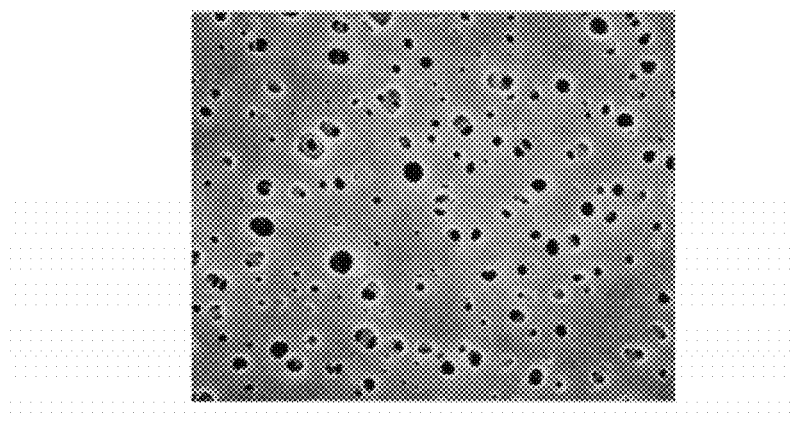
FIG. 2 is an electron microscope image (magnified 10,000×) of the outer surface of the membrane according to Example 1.
Figure 3:
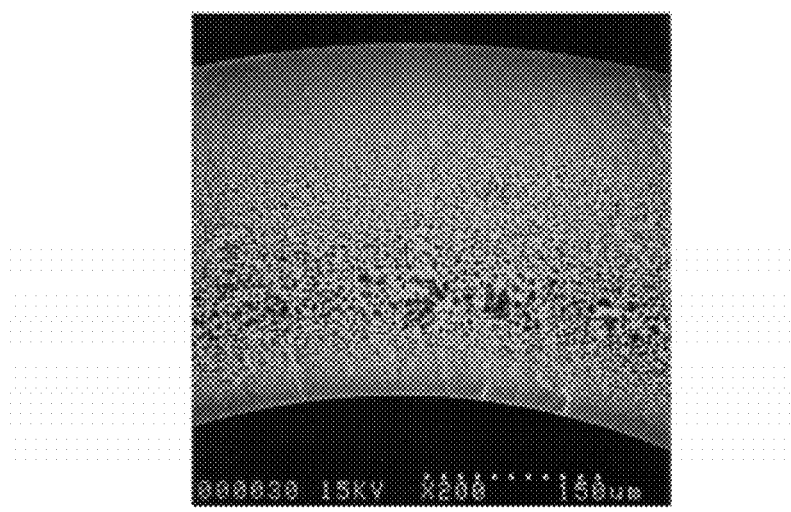
FIG. 3 is an electron microscope image (magnified 200×) of a cross section of the membrane according to Example 1.

FIG. 1 to FIG. 3 are SEM images of the inner surface, the outer surface, and the cross section, respectively, of the hollow fiber membrane. The images show that the porosity of the hollow fiber membrane increases from the inner surface toward the outer surface, the porosity being maximum in at least one portion and thereafter decreasing toward the outer surface.

The sample for thermo-mechanical analysis was prepared using the obtained hollow fiber membrane. According to the above method, the depression amount of the inner surface of the hollow fiber membrane was measured. The depression amount under a load of 0.6 N was −51.8 μm, and the depression amount under a load of 1.0 N was −90.5 μm. The amount of change in depression amount ((|B|−|A|)/membrane thickness×100(%)) was 10.9%. The results are shown in Table 1.

Example 2

A hollow fiber membrane was produced using the same method as in Example 1, except that the membrane-forming solution was formed with PES (20.0 wt. %), PVP (K30) (5.0 wt. %), NMP (33.75 wt. %) and TEG (41.25 wt. %); the inner liquid was formed with a mixture of NMP (36.0 wt. %), TEG (44.0 wt. %) and RO water (20.0 wt. %) and a different condition was used to feed the hollow fiber membrane to the coagulating bath. The obtained hollow fiber membrane was wound up. In the coagulating bath, three cylindrical guides with diameters of 100 mm were arranged to gradually change the feeding direction of the hollow fiber membrane to pull it out from the coagulating bath. More specifically, the feeding direction of the hollow fiber membrane was changed at the curvature radius of 50 mm, and at three turning points. The immersion depth for the hollow fiber membrane in the coagulating bath was a maximum of 800 mm, and the feeding distance for the hollow fiber membrane in the same bath was 2,000 mm. The ends of the skein having the hollow fiber membrane bundle wound therearound were bound with tape, and the outer surface of the tape was cleaved with a cutter so as not to damage the cross section of the hollow fiber membrane. Then, the bundle was vertically disposed to remove liquids from the hollow portions of the hollow fiber membranes and allowed to stand for 60 minutes. As to the concentration of the inner liquid in the hollow fiber membrane, the amount of NMP (good solvent) was 21.5 wt. %, while the amount of TEG (nonsolvent) was 26.8 wt. % The bundle was immersed in RO water at 80° C. for 60 minutes for heat treatment. After that, the bundle was dried with hot air at 60° C. for 10 hours to obtain hollow fiber membranes with an inner diameter of 1,215 μm and a thickness of 348 μm. Table 1 shows the results.

Flux was measured using the same method as in Example 1. Flux sustainability and recoverability by washing were both high, i.e., 63% and 93%, respectively. The structure of the hollow fiber membrane was the same as that in Example 1. The size change of the inner surface of the hollow fiber membrane in the direction along the cross section was measured according to (((|B|−|A|)/membrane thickness×100(%)), with the result of 6.3%.

Example 3

A hollow fiber membrane was produced using the same method as in Example 1, except that the temperature of the external coagulating liquid was set to 40° C. The inner diameter and the thickness of the obtained hollow fiber membrane were 1,180 µm and 340 µm, respectively. Table 1 shows the results.

Flux was measured using the same method as in Example 1. Flux sustainability and recoverability by washing were both high, i.e., 81% and 90%, respectively. The structure of the hollow fiber membrane was the same as that in Example 1. The size change of the inner surface of the hollow fiber membrane in the direction along the cross section was measured according to ((|B|−|A|)/membrane thickness×100(%)), with the result of 7.0%.

Example 4

A hollow fiber membrane was produced using the same method as in Example 2, except that the temperature of the external coagulating liquid was set to 65° C. The inner diameter and the thickness of the obtained hollow fiber membrane were 1,201 µm and 356 µm, respectively. Table 1 shows the results.

Flux was measured using the same method as in Example 1. Flux sustainability and recoverability by washing were both high, i.e., 49% and 85%, respectively. The structure of the hollow fiber membrane was the same as that in Example 1. The size change of the inner surface of the hollow fiber membrane in the direction along the cross section was measured according to ((|B|−|A|)/membrane thickness×100(%)), with the result of 14.8%.

Comparative Example 1

A hollow fiber membrane was produced using the same method as in Example 1, except that the membrane-forming solution was formed with a mixture of PES (22.0 wt. %), PVP (K30) (3.0 wt. %), NMP (37.5 wt. %) and TEG (37.5 wt. %); and the inner liquid was formed with a mixture of NMP (40.0 wt. %), TEG (40.0 wt. %) and RO water (20.0 wt. %). The obtained hollow fiber membrane was wound into a skein. Without being left to stand, the bundle was immediately cut into pieces of predetermined lengths. Then, the bundle was vertically disposed to remove liquids from the hollow portions of the hollow fiber membranes. Here, in the hollow fiber membranes, the amount of NMP (good solvent) was 9.7 wt. %, while the amount of TEG (nonsolvent) was 13.8 wt. % The bundle was immersed in RO water at 80° C. for 60 minutes for heat treatment. After that, the bundle was dried with hot air at 60° C. for 10 hours to obtain hollow fiber membranes with an inner diameter of 1,171 µm and a thickness of 540 µm. Flux sustainability and recoverability by washing were both low, i.e., 40% and 72%, respectively. Although the structure of the hollow fiber membrane was the same as that in Example 1, the size change of the inner surface of the hollow fiber membrane in the direction along the cross section, measured according to ((|B|−|A|)/membrane thickness×100(%)), was 4.3%. Table 1 shows the results.

Comparative Example 2

A hollow fiber membrane was produced using the same method as in Example 1, except that the membrane-forming solution was formed with a mixture of PES (15.0 wt. %), PVP (K30) (3.0 wt. %), NMP (36.9 wt. %) and TEG (45.1 wt. %), the inner liquid was formed with a mixture of NMP (38.25 wt. %), TEG (46.75 wt. %) and RO water (15.0 wt. %), and the produced hollow fiber membrane did not pass through the water-washing bath. The obtained hollow fiber membrane was wound into a skein, and the bundle was allowed to stand for 60 minutes and then cut into pieces of predetermined lengths to form a bundle. Then, the bundle was vertically disposed to remove liquids from the hollow portions of the hollow fiber membranes. Here, in the hollow fiber membranes, the amount of NMP (good solvent) was 37.5 wt. %, while the amount of TEG (nonsolvent) was 47.2 wt. % The bundle was immersed in Ro water at 80° C. for 60 minutes for heat treatment. After that, the bundle was dried with hot air at 60° C. for 10 hours to obtain hollow fiber membranes with an inner diameter of 1,175 µm and a thickness of 345 µm. The size change measured according to ((|B|−|A|)/membrane thickness×100(%)) was 23.2%. During the flux measurement, the membrane broke. Further, measurements of pure water flux and bubble point failed due to breakage of the membrane upon application of pressure. Table 1 shows the results.

Comparative Example 3

Figure 4:
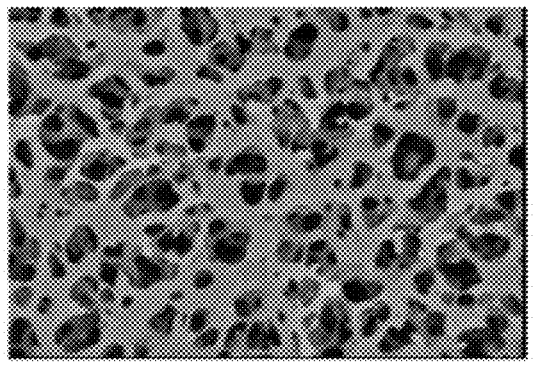
FIG. 4 is an electron microscope image (magnified 1,000×) of the inner surface of a PVDF-MF membrane (Comparative Example 3).
Figure 5:
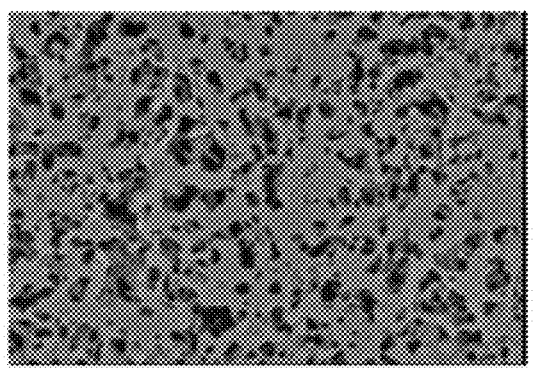
FIG. 5 is an electron microscope image (magnified 1,000×) of the outer surface of the PVDF-MF membrane (Comparative Example 3).
Figure 6:
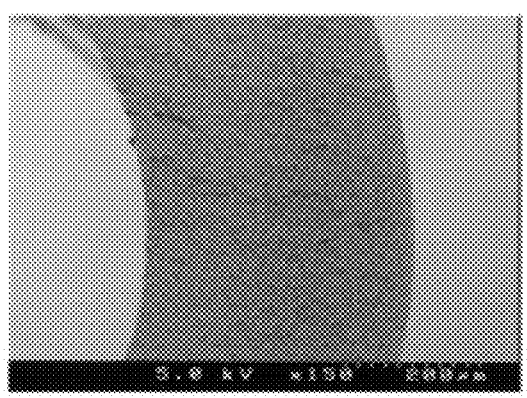
FIG. 6 is an electron microscope image (magnified 150×) of the cross section of the PVDF-MF membrane (Comparative Example 3).

A commercially available polyvinylidene fluoride microfiltration membrane (hereinafter referred to as PVDF-MF membrane) was subjected to the same measurements as in Example 1. Flux sustainability and recoverability by washing were both low, i.e., 42% and 78%, respectively. The size change of the hollow fiber membrane measured according to ((|B|−|A|)/membrane thickness×100(%)) using thermo-mechanical analyzer was 3.8%. FIG. 4 to FIG. 6 are SEM images of the inner surface, the outer surface, and the cross section of the obtained hollow fiber membrane. This membrane was found to be a homogeneous symmetric membrane, and no portion having a maximum porosity was found in the wall portion of the membrane.

Comparative Example 4

PES (Sumika EXCEL® 4800P manufactured by Sumitomo Chemtex) (17.5 wt. %), PVP (Kolidone® K90 manufactured by BASF) (4.5 wt. %), DMAc (75.0 wt. %) and RO water (3.0 wt. %) were mixed and dissolved at 50° C. for two hours to form a homogenous solution. The solution was decompressed at 50° C. from an atmospheric pressure to −700 mmHg. Immediately afterward, the system was sealed so as not to change the composition of the solution due to the volatilization of the solvent or the like, and the solution was left to stand for two hours so as to be defoamed. The resulting solution was used as a membrane-forming solution. A mixture of DMAc (40.0 wt. %) and RO water (60.0 wt. %) was prepared as a inner liquid. The membrane-forming solution and the inner liquid were discharged from the annular portion and the center portion of a double tube nozzle, respectively; the resultant filament was allowed to pass through an air gap with a length of 450 mm, and was then introduced into a coagulating bath filled with an external coagulating liquid consisting of a mixture of DMAc (20.0 wt. %) and RO water (80.0 wt. %). In this operation, the nozzle temperature was 65° C., and the temperature of the external coagulating liquid was 60° C. In the coagulating bath, one rod-like guide with a diameter of 12 mm was used to change the feeding direction of the hollow fiber membrane to draw it from the coagulating bath. The immersion depth for the hollow fiber membrane in the coagulating bath was a maximum of 200 mm, and the feeding distance for the hollow fiber membrane in the same bath was 600 mm. The resulting hollow fiber membrane was lead to a water-washing bath and wound by a two-point winding machine to obtain 2 m skeins at a rate of 75 m/min. The amounts of the membrane-forming solution and the inner liquid to be discharged were controlled so that the hollow fiber membrane has an inner diameter of about 202 μm and a thickness of about 30 μm.

The resultant hollow fiber membrane was wrapped in a high-density polyethylene film (150 μm in thickness) in the form of a bundle of 10,000 fibers, and then cut into pieces with lengths of 280 mm to obtain a bundle of the hollow fiber membranes. The diameter and the length of the bundle were 35 mm and 280 mm, respectively. The obtained bundle of the wet hollow fiber membranes was subjected to centrifugal dewatering at 600 rpm for 5 minutes, exposed to microwaves in a microwave generator that had an oven lined with a reflecting plate to carry out uniform heating, and dried for 60 minutes while the inner pressure of the drier was reduced to 7 kPa. The output of the microwave was decreased by 0.5 kW every 20 minutes from the initial output of 1.5 kW. Through this drying treatment, a hollow fiber membrane with an inner diameter of 199 μm and a thickness of 29 μm was obtained.

Figure 7:
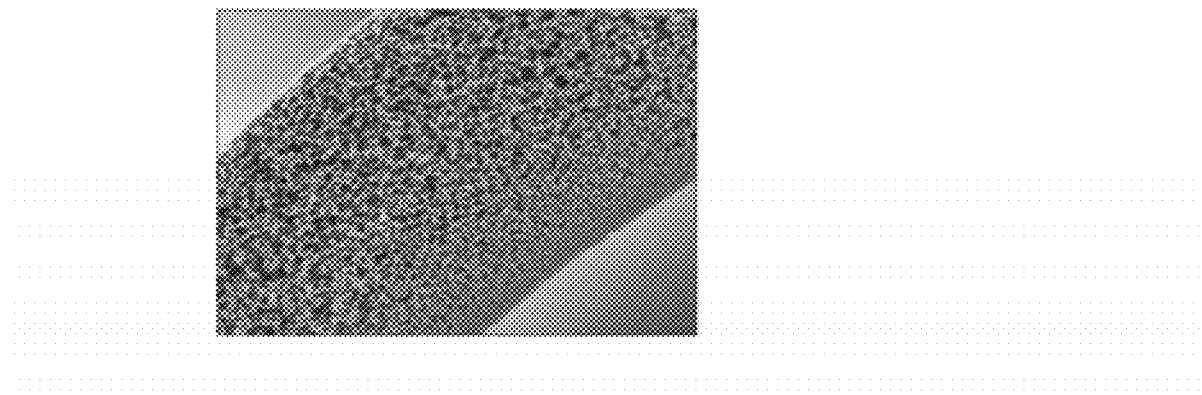
FIG. 7 is an electron microscope image (magnified 3,000×) of the cross section of a membrane according to Comparative Example 4.

Flux sustainability and recoverability by washing of the obtained hollow fiber membrane were both low, i.e., 36% and 45%, respectively. FIG. 7 is an SEM image of the cross section of the obtained hollow fiber membrane. In this hollow fiber membrane, porosity was increased from the inner surface to the outer surface, and no portion having a maximum porosity was found.

INDUSTRIAL APPLICABILITY

The polymeric porous hollow fiber membrane of the present invention is useful for treatment of liquids in the food field, the medical field, the semiconductor field, the energy field and the water treatment field. The hollow fiber membrane of the present invention can be widely used for industrial uses such as ultrafiltration or microfiltration, or medical uses such as hemodialysis, blood filtration, hemodiafiltration or the like. Particularly, the hollow fiber membrane of the present invention is suitable for a hollow fiber membrane for treating fermented liquids in the food field, which serves to remove yeast fluids, solid matter, colloids or the like from beer or wine.

The invention claimed is:

1. A hollow fiber membrane for treating liquids, wherein the hollow fiber membrane comprises a polysulfone-based polymer and polyvinylpyrrolidone, and has a structure such that:
   (a) dense layers are formed on the inner and outer surfaces;
   (b) a pore diameter in the vicinity of the inner surface is smaller than a pore diameter in the vicinity of the outer surface; and
   (c) a porosity of the hollow fiber membrane increases from the inner surface toward a portion between the inner surface and the outer surface, the porosity being maxi-

TABLE 1

| Items | Ex. 1 | Ex. 2 | Ex. 3 | Ex. 4 | Co. Ex. 1 | Co. Ex. 2 | Co. Ex. 3 | Co. Ex. 4 |
|---|---|---|---|---|---|---|---|---|
| Inner diameter (μm) | 1185 | 1215 | 1180 | 1201 | 1171 | 1163 | 1383 | 199 |
| Thickness (μm) | 354 | 348 | 340 | 356 | 540 | 342 | 402 | 29 |
| Flux 30 (L/m²/h/bar) | 52 | 48 | 32 | 57 | 42 | — | 55 | 11 |
| Flux 120 (L/m²/h/bar) | 35 | 30 | 26 | 28 | 17 | — | 23 | 4 |
| Flux sustainability (Flux120/Flux30) (%) | 67 | 63 | 81 | 49 | 40 | — | 42 | 36 |
| Recoverability by washing (%) | 95 | 93 | 90 | 85 | 72 | — | 78 | 45 |
| Pure water flux (L/m²/h/bar) | 1350 | 985 | 629 | 2145 | 982 | — | 1750 | 325 |
| Maximum pore diameter (μm) | 0.22 | 0.20 | 0.19 | 0.28 | 0.32 | — | 0.25 | — |
| Depression amount A at 0.6N (μm) | −51.8 | −48.0 | −46.0 | −52.8 | −32.5 | −43.1 | −26.5 | — |
| Depression amount B at 1.0N (μm) | −90.5 | −70.2 | −69.8 | −105.5 | −48.8 | −122.5 | −41.7 | — |
| (|B| − |A|)/membrane thickness × 100 (%) | 10.9 | 6.3 | 7.0 | 14.8 | 4.3 | 23.2 | 3.8 | — |
| Porosity of inner surface (%) | 8 | 9 | 6 | 13 | 7 | 22 | 35 | 0.01 |
| Pore diameter of inner surface (μm) | 0.04 | 0.04 | 0.03 | 0.06 | 0.04 | 0.18 | 0.31 | 8 |
| Porosity of maximum pore portion (%) | 59 | 57 | 48 | 66 | 72 | 81 | No maximum pore portion | No apparent maximum pore portion |
| Porosity of outer surface (%) | 12 | 11 | 9 | 17 | 10 | 23 | 26 | 16 |
| Pore diameter of outer surface (μm) | 0.05 | 0.05 | 0.04 | 0.08 | 0.04 | 0.17 | 0.18 | 0.54 |

*Ex. = Example
Co. Ex. = Comparative Example mum at said portion and thereafter decreasing toward the outer surface, wherein the porosity at the inner surface is less than the porosity at the outer surface, and wherein a ratio of Flux 120 to Flux 30 is 0.45 or higher when filtration is performed by supplying a solution having a turbidity of 20 NTU into a hollow fiber membrane having an internal diameter of 500 to 1500 µm and a membrane thickness of 100 to 500 µm with a transmembrane pressure of 1.5 bar, the Flux 30 being flux 30 minutes after the start of the filtration, and the Flux 120 being flux 120 minutes after the start of the filtration.

2. The hollow fiber membrane for treating liquids according to claim 1, wherein the Flux 30 is 30 L/m$^2$/h/bar or higher.

3. The hollow fiber membrane for treating liquids according to claim 1 or 2, wherein pure water flux from inside of the hollow fiber membrane to outside of the hollow fiber membrane under 22° C. and 1 bar falls within a range of from 500 to 2500 L/m$^2$/h/bar.

4. The hollow fiber membrane for treating liquids according to claim 1 or 2, wherein the pore diameter of the inner surface of the hollow fiber membrane ranges from 0.001 to 1 µm, the pore diameter of the portion having a maximum porosity ranges from 0.1 to 10 µm, and the pore diameter of the outer surface of the hollow fiber membrane ranges from 0.02 to 2 µm.

5. The hollow fiber membrane for treating liquids according to claim 1 or 2, wherein the porosity in the inner surface ranges from 5 to 20%, the porosity in the portion having a maximum porosity ranges from 40 to 80%, and the porosity in the outer surface ranges from 7 to 22%.

* * * * *